UNITED STATES PATENT OFFICE 2,650,206

HEAT-RESISTANT COMPOSITION AND METHOD OF MAKING SAME

Robert P. Stock, Cuyahoga Falls, Ohio, assignor to The B. F. Goodrich Company, New York, N. Y., a corporation of New York No Drawing. Application April 25, 1950,
Serial No. 158,065

4 Claims. (Cl. 260—17.4)

This invention relates to a heat-resistant coating composition and pertains more particularly to a composition which forms a heat-insulating covering when the composition is heated above a temperature critical to said composition.

It is an object of this invention to provide an improved heat-resistant coating composition adapted for coating the surfaces of a combustible material.

Another object of this invention is to provide a method of making a heat-protecting coating composition which is not injurious to combustible materials upon which the heat-protecting composition is applied.

A further object of this invention is to provide a heat-resistant composition which furnishes a non-friable flexible coating.

Still another object of this invention is to provide an article which will withstand extreme heat for a short period of time.

It is also an object of this invention to provide a heat-resistant coating composition which is readily applied to the surface of a combustible material.

Other objects of this invention will be apparent from the description which follows.

As a result of the vast destruction caused by fire, numerous materials has been proposed as coating compositions for combustible materials in an effort to retard or confine flames until suitable apparatus for combatting the flames can be obtained or until people in a position of peril because of the flames can reach a place of safety.

Conventional flame-retardant compositions which are applied to combustible surfaces in the form of a coating or covering have proven unsatisfactory in that they generally are inherently friable and tend to crumble, exposing portions of the coated combustible material to the flames; the coatings have a low tensile strength and will not withstand forces normally exerted on such coatings; the coating compositions are generally bulky and difficult to apply as a covering to the surface of a combustible material; the fire-retardant compositions are commonly brittle when formed into a coating on a combustible material and the coating readily cracks and breaks away exposing portions of the combustible material; and the coating compositions often are toxic endangering the health of workmen coming in contact with them.

I have now discovered a heat-resistant composition which may readily be applied to the surface of a heat-sensitive or combustible material forming a coating or covering which protects the combustible material from flames and heat. A composition made in accordance with my invention comprises an elastomeric material which is incapable of supporting combustion, a carbonific or carbon-yielding substance, a spumific or foam-producing substance capable of foaming the carbonific into a spongy porous frothy carbonaceous mass when the composition is subjected to heat above a temperature critical to the stability of the composition, and a volatile liquid medium.

A coating composition made in accordance with this invention is relatively flexible when formed into a coating providing a protective covering for combustible materials which will withstand forces normally exerted thereon; is non-friable providing a coating which is much more durable than conventional flame-resistant coatings; will protect the combustible material coated therewith from extreme temperatures; is not injurious to commonly known combustible materials; does not readily crack or chip rendering the coating less effective; and is readily applied to the surfaces of an article.

A heat-resistant coating composition formed in accordance with this invention comprises an elastomeric rubber-like material which does not inherently support combustion, or an aqueous dispersion thereof. The elastomer, being substantially non-combustible, provides flame-retardant properties for the coating composition. The elastomer also provides the composition with numerous desired physical properties among which are: increased flexibility as compared to conventional heat-retardant coatings, excellent durability, and excellent adhesion properties. Although any rubber-like material which does not support combustion is suitable as the elastomeric ingredient in a heat-retardant coating composition made in accordance with this invention, it is preferably that the elastomeric material be a rubbery polymer of a monomeric material consisting predominantly of chloroprene (neoprene rubbers), or rubbery organo-silicon halide polymers commonly referred to as rubbery silicones. It is necessary that the elastomeric material which does not support combustion comprise from 20 to 60 percent by weight of the total weight of the coating composition to impart the desired properties to the coating composition.

To facilitate the mixing of the heat-resistant coating composition and the application of the covering composition onto surfaces to be coated with the composition, the rubber-like ingredient of the coating composition is employed in the form of a solution or dispersion in a volatile liquid medium such as water or an organic solvent, for example methyl ethyl ketone, solvent naphtha, benzene and the like. Preferably the liquid medium comprises from 5 to 75 percent by weight of the total weight of the coating composition.

Ingredients commonly compounded with the elastomeric material such as fillers, antioxidants, accelerators, vulcanizing agents, etc., may also be included in the coating composition.

The fire-retardant coating composition is quite stable at ordinary temperatures but if the coating is exposed to heat above a temperature critical to the stability of the coating, the carbonific, which is a constituent of the coating composition, is converted to a frothy spongy porous carbonaceous mass. The layer of spongy carbonaceous foam is in itself an insulating material providing protection for the combustible material from flames. The spongy mass of carbonaceous foam covering the combustible material further protects the combustible material by absorbing or trapping inflammable gases given off by the combustible material caused by the destructive distillation or degeneration of the combustible material when exposed to extreme heat. The physical structure of the spongy frothy carbonaceous mass excludes air from the combustible material thereby reducing the quantity of oxygen, a necessary element for combustion, contacting the combustible material.

The carbon-yielding material or carbonific in my composition may be any solid carbonaceous material or a mixture of such materials which will not volatilize at elevated temperatures but which is capable of being converted by the action of a spumific or foam-producing substance to a spongy porous frothy carbonaceous mass. Carbohydrates, such as sugar, starch, dextrin, and the like, are suitable as the carbonaceous material even though these materials in themselves are combustible and urea-formaldehyde resins have also proven very satisfactory; urea-formaldehyde resins having a molecular ratio of between 1 and 2.5 moles of formaldehyde to 1 mole of urea being preferred. Most satisfactory results have been obtained using as the carbonific a mixture of a urea-formaldehyde resin and a non-resinous carbonaceous material which is capable of being converted to a carbonaceous foam by the action of the spumific thereon above a critical temperature, such as carbohydrates; preferably the mixture consists of from 20 to 80 percent by weight of the urea-formaldehyde resin. It is necessary that the carbonific comprise from 30 to 80 percent by weight of the total weight of the coating composition to impart the desired properties to the coating composition.

The spumific or foam-producing substance may be any substance which at a temperature below the ignition temperature of the combustible material coated with my composition causes the carbonific to be converted to a frothy spongy carbonaceous mass. It is preferable that the spumific convert the carbonific to a foamy mass at a temperature between 130° and 250° C. Among those materials suitable as the foam-producing substance in my composition are aluminum sulfate, ammonium sulfamate, ammonium sulfate, monoammonium phosphate, diammonium phosphate, phosphoric acid, ammonium bromide, boric acid, zinc chloride, sodium tungstate, and the like. It is necessary that between 30 and 80 percent by weight of the total weight of carbonific and spumific present in the heat-retardant composition consist of the spumific ingredient.

Several substances which are particularly satisfactory as the foam-producing ingredient in my composition inherently tend to ferment, diminishing the flame-protecting properties of the coating and often causing deterioration of materials in contact with the coating. It is preferable, therefore, to incorporate into a composition made in accordance with this invention from 0.1 to 10.0 percent of a bactericide and/or a fungicide based on the total weight of the coating composition to prevent the formation of bacteria and/or fungi which would be detrimental to the flame-retarding coating and the material coated therewith. Among the chemicals which may be incorporated into the composition to prevent the growth of bacteria or fungi are fluorides, arsenates, arsenites, copper ammonia salts, zinc ammonia salts, organic fungicides such as phenylphenol, and the like.

Although the ingredients of my composition may be compounded by any method commonly employed, a preferred method of forming my composition is to employ the elastomeric material which is incapable of supporting combustion in the form of a solution in an organic solvent or as an aqueous dispersion or latex, mixing the remaining ingredients of the composition into a paste using either an organic solvent or water as a moistening medium, and incorporating the paste into the elastomer solution or dispersion. It is preferable that the resulting composition be agitated for a sufficient length of time (10 to 60 minutes or more) to assure that a homogenous mixture is obtained.

The quantity of solvent or diluent employed in the coating composition is dependent upon the viscosity desired in the coating composition; a thick paste having a relatively high viscosity may be obtained by using a relatively small quantity of the diluent in the composition or a low viscosity composition may be obtained by employing a relatively large quantity of diluent in the composition.

The heat-retarding coating composition may be applied to the surface desired to be protected from heat by any method commonly employed in coating materials, such as by dipping, brushing, spreading, spraying, etc. Upon allowing the coated article to stand the diluent evaporates from the coating forming a flexible adherent non-friable coating which is stable until the coating is heated above a critical temperature above which the foaming agent converts the carbonific to a frothy porous spongy carbonaceous layer.

Examples of compositions prepared in accordance with my invention are illustrated by the following recipes which are included merely for purposes of illustration, and are not intended to limit the scope of this invention.

*Example I*

| Material: | Parts by weight |
|---|---|
| Rubbery chloroprene polymer (GR-M) | 100.0 |
| Methyl ethyl ketone | 120.0 |
| Diammonium phosphate | 200.0 |
| Dextrin | 200.0 |
| Zinc oxide | 4.0 |
| Potassium arsenate | 25.0 |
| Total | 649.0 |

The rubbery chloroprene polymer, diammonium phosphate, dextrin, zinc oxide, potassium arsenate and methyl ethyl ketone are mixed together and the resulting composition is agitated until a homogeneous mixture is obtained.

Example II

| Material: | Parts by weight |
|---|---|
| Rubbery chloroprene polymer (GR–M) | 100.0 |
| Solvent-naphtha | 100.0 |
| Sugar | 100.0 |
| Ammonium bromide | 300.0 |
| Zinc oxide | 4.0 |
| Para-phenylphenol | 35.0 |
| Total | 639.0 |

The rubbery chloroprene polymer is dissolved in the solvent naphtha, the sugar, ammonium bromide, zinc oxide and para-phenylphenol are formed into a paste using solvent naphtha as a moistening agent, the paste is mixed into the naphtha having the rubbery chloroprene polymer dissolved therein, and the resulting composition is agitated for about 30 minutes.

Example III

| Material: | Parts by weight |
|---|---|
| Rubbery chloroprene polymer (GR–M) | 100.0 |
| Methyl ethyl ketone | 75.0 |
| Diammonium phosphate | 175.0 |
| Urea-formaldehyde resin | 100.0 |
| Dextrin | 75.0 |
| Zinc oxide | 3.5 |
| Para-phenylphenol | 25.0 |
| Total | 553.5 |

The rubbery chloroprene polymer, diammonium phosphate, urea-formaldehyde resin, dextrin, zinc oxide, para-phenylphenol and methyl ethyl ketone are mixed together and the composition is agitated for about 45 minutes.

Example IV

| Material: | Parts by weight |
|---|---|
| Aqueous dispersion of rubbery chloroprene polymer (50% total solids) | 200.0 |
| Diammonium phosphate | 150.0 |
| Urea-formaldehyde resin | 125.0 |
| Dextrin | 100.0 |
| Zinc oxide | 5.0 |
| Potassium arsenate | 20.0 |
| Water | 75.0 |
| Total | 675.0 |

The neoprene latex, diammonium phosphate, urea-formaldehyde resin, dextrin, zinc oxide and potassium arsenate are mixed into the water and the composition is agitated for about 15 minutes.

The coating composition and, therefore, the ultimate coating of fire-retardant composition may be formed in numerous colors by merely adding an appropriate coloring material to the coating composition.

A heat-retardant coating composition made in accordance with this invention is applicable in coating all materials in the solid state, such as wood, rubber, structural metals and alloys of metals, gypsum wallboard, cellulosic wallboard, paper, cardboard, etc. and provides a flexible non-friable heat-retarding covering for articles coated therewith.

My heat-retardant coating composition is particularly useful in coating fuel tanks, such as those used in airplanes, fuel hose, electrical cables, and walls of dwelling houses and other buildings.

It is also within the purview of my invention to coat a paper or carboard container with my composition or to form a double-walled container having a layer of my heat-retardant composition disposed between said walls.

An article coated with a heat-retardant composition made in accordance with this invention will withstand extreme heat without deterioration of the article itself. Because of the fire-retardant properties of my composition its use decreases the rapidity with which a fire would otherwise spread and permits the fire to be readily extinguished.

It is clear that obvious modifications and variations of my invention may be made without departing from the spirit and scope of my invention as defined in the appended claims.

I claim:

1. A coating composition comprising 20 to 60 percent by weight based on the total weight of said coating composition of a rubbery polymer of chloroprene, a volatile liquid diluent, a carbohydrate, and a foaming agent selected from the group consisting of aluminum sulfate, ammonium sulfamate, ammonium sulfate, monoammonium phosphate, diammonium phosphate, phosphoric acid, ammonium bromide, zinc chloride, boric acid and sodium tungstate, said carbohydrate comprising 30 to 80 percent by weight of the total weight of said coating composition and said foaming agent comprising 30 to 80 percent by weight of the total weight of said carbohydrate and foaming agent present in said coating composition.

2. A coating composition comprising 20 to 60 percent by weight based on the total weight of said coating composition of a rubbery polymer of chloroprene, from 5 to 75 percent by weight based on the total weight of said coating composition of a volatile liquid diluent, a carbohydrate, and a foaming agent selected from the group consisting of aluminum sulfate, ammonium sulfamate, ammonium sulfate, monoammonium phosphate, diammonium phosphate, phosphoric acid, ammonium bromide, zinc chloride, boric acid and sodium tungstate, said carbohydrate comprising 30 to 80 percent by weight of the total weight of said coating composition and said foaming agent comprising 30 to 80 percent by weight of the total weight of said carbohydrate and foaming agent present in said coating composition.

3. A coated article having a coating comprising 20 to 60 percent by weight based on the total weight of said coating of a rubbery polymer of chloroprene, a carbohydrate, and a foaming agent selected from the group consisting of aluminum sulfate, ammonium sulfamate, ammonium sulfate, monoammonium phosphate, diammonium phosphate, phosphoric acid, ammonium bromide, zinc chloride, boric acid and sodium tungstate, said carbohydrate comprising 30 to 80 percent by weight of the total weight of said coating and said foaming agent comprising 30 to 80 percent by weight of the total weight of said carbohydrate and foaming agent present in said coating.

4. A coating composition comprising 20 to 60 percent by weight based on the total weight of said coating composition of a rubbery polymer of chloroprene, an organic volatile solvent for said rubbery polymer of chloroprene, a carbohydrate, and a foaming agent selected from the group consisting of aluminum sulfate, ammonium sulfamate, ammonium sulfate, monoammonium phosphate, diammonium phosphate, phosphoric acid, ammonium bromide, zinc chloride, boric acid and sodium tungstate, said carbohydrate comprising 30 to 80 percent by weight of the total weight of said coating composition and said foaming agent comprising 30 to 80 percent by weight of the total weight of said carbohydrate and foaming agent present in said coating composition.

ROBERT P. STOCK.

References Cited in the file of this patent

UNITED STATES PATENTS

| Number | Name | Date |
|---|---|---|
| 2,277,941 | Almy | Mar. 31, 1942 |
| 2,340,358 | Young | Feb. 1, 1944 |
| 2,357,725 | Bennett | Sept. 5, 1944 |
| 2,433,849 | Lathrop et al. | Jan. 6, 1948 |
| 2,452,054 | Jones et al. | Oct. 26, 1948 |

FOREIGN PATENTS

| Number | Country | Date |
|---|---|---|
| 625,215 | Great Britain | June 23, 1949 |

OTHER REFERENCES

Du Pont, Rubber Chemicals Division, Wilmington, Delaware, Report No. B1-105, July 28, 1943, pp. 1 and 7.